(12) United States Patent
Kraemer et al.

(10) Patent No.: US 7,682,430 B2
(45) Date of Patent: Mar. 23, 2010

(54) DEVICE FOR EXTRACTING GAS OR LIQUID FROM MICROFLUIDID THROUGH-FLOW SYSTEMS

(75) Inventors: Peter Kraemer, Deidesheim (DE);
Carlo Effenhauser, Weinheim (DE);
Karl-Heinz Koelker, Gruenstadt (DE);
Gregor Ocvirk, Mannheim (DE)

(73) Assignee: Roche Diagnostics Corporation, Indianapolis, IN (US)

( * ) Notice: Subject to any disclaimer, the term of this patent is extended or adjusted under 35 U.S.C. 154(b) by 1603 days.

(21) Appl. No.: 10/487,101

(22) PCT Filed: Aug. 13, 2002

(86) PCT No.: PCT/EP02/09040

§ 371 (c)(1),
(2), (4) Date: Sep. 1, 2004

(87) PCT Pub. No.: WO03/015919

PCT Pub. Date: Feb. 27, 2003

(65) Prior Publication Data

US 2005/0000364 A1    Jan. 6, 2005

(30) Foreign Application Priority Data

Aug. 18, 2001    (DE) .................. 101 40 565

(51) Int. Cl.
*B01D 19/00* (2006.01)
(52) U.S. Cl. .................. 96/155; 422/100
(58) Field of Classification Search .......... 96/155, 96/193; 422/100
See application file for complete search history.

(56) References Cited

U.S. PATENT DOCUMENTS

| 3,744,492 A | 7/1973 | Leibinsohn |
| 3,926,594 A | 12/1975 | Seib et al. |
| 4,143,659 A | 3/1979 | Biedermann |
| 4,382,806 A | 5/1983 | Hakala et al. |
| 5,102,400 A | 4/1992 | Leibinsohn |
| 5,277,691 A * | 1/1994 | Eaton et al. .................. 494/37 |
| 5,830,185 A | 11/1998 | Block, Jr. |
| 6,013,060 A | 1/2000 | Woodard |

FOREIGN PATENT DOCUMENTS

| EP | 0 522 090(B1) | 6/1995 |
| EP | 0 787 503(A1) | 8/1997 |
| JP | 52144183 A | 12/1977 |
| JP | 6023758 A | 2/1994 |
| JP | 10315266 A | 12/1998 |
| JP | 2001324975 A | 11/2001 |

OTHER PUBLICATIONS

JP Office Action mailed Jan. 30, 2007 citing new JP reference in corresponding JP case.

* cited by examiner

*Primary Examiner*—Robert A Hopkins
(74) *Attorney, Agent, or Firm*—Bose McKinney & Evans LLP

(57) ABSTRACT

The invention concerns a device which is used to separate gas or liquid from microfluidic flow-through systems. The gas or liquid separation is achieved independently of the spatial orientation of the device. In addition the invention concerns a microfluidic flow-through system in which a device according to the invention enables bubble-free fluid transport.

25 Claims, 3 Drawing Sheets

DEVICE FOR EXTRACTING GAS OR LIQUID FROM MICROFLUIDID THROUGH-FLOW SYSTEMS

Figure 1:
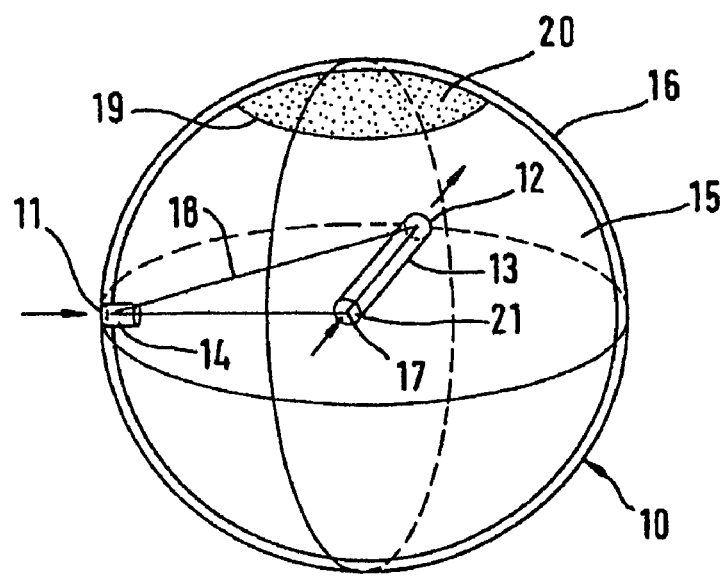

The invention enables separation of gas or liquid from microfluidic flow-through systems which can be operated independently of orientation.

Microfluidic flow-through systems have a wide variety of applications and are predominantly used in analytical methods for medical diagnostics. In some medical fields and in particular for diabetes monitoring it is of major advantage to continuously or at least semicontinuously monitor the glucose level. This enables the timely detection of hypoglycaemic states that could lead to the death of the patient and also gives the patient a warning about hyperglycaemic states which are usually associated with long-term damage (loss of sight, gangrene etc.). Thus recently much effort has been made to enable a continuous monitoring of the blood glucose concentration. Conventional methods for monitoring the glucose content of blood commonly make use of portable devices so-called blood sugar measuring instruments. However, a disadvantage of this analytical method is that a body fluid has to be withdrawn which usually limits the field of application to single measurements.

For a continuous monitoring of the glucose content the patient has to carry the analytical system and thus it is essential to miniaturize the analytical system. Microdialysis technology is nowadays a reliable method for monitoring analyte concentrations in vivo. If the analytical system has a small size the patient can routinely and discreetly carry it around with him without much hindrance and use it to regularly check the concentration. For this purpose a small microdialysis probe is inserted into the body in a manner which is easy and not very traumatic for the patient. In microdialysis a perfusion liquid is passed through a catheter and an analyte is determined in the dialysate which emerges from the catheter, the said dialysate having taken up the analyte (glucose) in the catheter from the body. A number of microdialysis probes are known in the prior art and reference is only made at this point to the arrangement described in the German Patent Application file number 10010587.4 as a representative example. Microdialysis has numerous requirements with regard to fluid handling. The liquid has to be present free of bubbles within the microdialysis system for an exact analytical result. This is the only way of ensuring reproducible liquid transport that enables an exact analyte determination.

Several methods for separating gases from liquids are disclosed in the prior art. However, these devices are not suitable for microfluidic applications. Moreover most systems cannot be operated independently of orientation. However, the purpose of microsystems is for example to provide a transportable analytical system that allows permanent in vivo monitoring. However, this requires that the transportable system can be operated independently of its orientation. In the prior art the patent EP 0552090B1 discloses a device for separating gases from liquids which can be operated in any orientation due to the manner in which fluid is transported. However, the device is not intended for use in the field of microanalysis. In the device the liquid is passed through liquid channels in which gas is separated. The channels are connected to a hydrophobic membrane so that gas can escape through the hydrophobic membrane into the surrounding atmosphere. However, this requires that the pressure of the liquid is higher than the external pressure. Another disadvantage that is particularly relevant for a miniaturization is the use of a membrane that would complicate the construction of a microdevice and be expensive for a disposable micro device.

The object of the invention is to remove bubbles that may be present in a fluid and to pass the fluid through a microfluidic system. A change in the operating conditions e.g. the position of the microfluidic flow-through system should not impair the gas or liquid separation.

The invention concerns a device for separating gas or liquid which can be operated independently of its orientation in a microfluidic flow-through system.

The invention concerns a device with a hollow body that can be connected to a microfluidic system such that a liquid to be transported can be passed through the body. The hollow body has an inlet and outlet opening for the inflow and discharge of liquids. The outlet opening is connected to a feed tube which extends into the interior space of the body. The inlet opening has no feed tube or has a feed tube which extends into the interior space of the body in such a manner that it essentially does not prevent a direct flow from the inlet opening to the outlet opening. In principle the hollow body can have several inlet and outlet openings which are characterized by the described features.

The invention also concerns a device for separating liquids from microfluidic flow-through systems that can be operated independently of its orientation. The device comprises a hollow body that can be connected to a microfluidic system such that a gas to be transported is passed through the hollow body. The hollow body has an inlet and outlet opening for feeding in and discharging gases wherein the outlet opening is connected to a feed tube which extends into the interior space of the body and the inlet opening has no feed tube or has a feed tube which extends into the interior space of the body in such a manner that it essentially does not prevent a direct flow from the inlet opening to the outlet opening. Consequently the hollow body essentially has a similar design and only differs in its function.

In a preferred embodiment the cross-section of the hollow body for gas or liquid separation is of such a size relative to the inlet opening or its feed tube that the flow rate is reduced when fluid is passed into the hollow space. In a device for gas separation, the reduction in the flow rate increases the pressure within the liquid relative to the environment which promotes separation of gas from the liquid. Furthermore gas bubbles can rise from the liquid resulting in a separation of gas bubbles and of gas dissolved in the liquid. In a device for liquid separation, liquid is preferably separated in an analogous manner. In the device for gas or liquid separation, the separated phase remains in the hollow space of the body displaces the flowing phase.

A device for gas separation can be connected to a microdialysis system in order to separate bubbles. Such a system is used to determine the concentration of at least one analyte in a body fluid. Within the scope of the present invention the term analyte includes all possible analytes such as glucose, lactate, proteins, minerals and neurotransmitters. Within the scope of the present invention the term "liquid" can encompass all possible body fluids and in particular interstitial fluid, blood and cerebral fluid. The system is primarily designed for in vivo diagnostics in humans, but it is also intended to encompass other potential applications e.g. in animals. Within the scope of the invention the term microdialysis system is used for embodiments in which substances are exchanged across a membrane between the outer space and a perfusion liquid. Microdialysis systems that are known in the prior art are described for example in the documents EP 0 649 628 and U.S. Pat. No 4,174,291. However, the device is for example also suitable for methods that are generally referred to as ultrafiltration in which the body fluid surrounding the system is filtered through the membrane. The membrane is primarily used to exclude high-molecular weight substances that would interfere with the analysis or age the sensor. The documents U.S. Pat. No. 4,777,953 and U.S. Pat. No. 4,832, 034 describe examples of the process of ultrafiltration. The exchange area in which the membrane is located preferably has an elongate design and is hence shaped like a rod. The end of the rod can for example be tapered to facilitate insertion into the human body. Numerous different types of application devices exist in the prior art which are not described in more detail here. Reference is only made to the documents WO 97/14468 (TFX Medical Inc.) and WO 95/20991 (CMA Microdialysis Holding AB) as examples.

If perfusion liquid is passed through a microdialysis probe while the exchange area is in contact with a body fluid, the perfusion liquid takes up substances from the body fluid. This enriched perfusion liquid, the dialysate, is then passed onto an analytical unit which for example measures the glucose concentration in the dialysate.

At least one sensor for detecting an analyte is located in the measuring area of the analytical unit. In order to detect glucose it is for example possible to use a metal electrode whose surface is coated with glucose oxidase or a reagent mixture containing glucose oxidase. However, it is also possible to add dissolved glucose oxidase to the measuring cell. This measuring procedure is described for example in the document EP B 0 393 054. For an exact detection of the analyte concentration it is important that the liquid is transported free from bubbles so that no gas is present at the electrodes which would lead to undefined conditions.

Furthermore it is advantageous for a microdialysis procedure to provide a reservoir for the perfusion liquid and/or a reservoir for receiving dialysate after the analysis which is either directly connected to the exchange area or is connected via a channel.

A pump is provided to transport perfusion liquid through the exchange area and on to the sensor area. Such a pump can for example operate under pressure and thus press out liquid from the perfusion liquid reservoir or can operate under suction and pull liquid through the system. In addition a pump can for example be arranged such that liquid is pulled out of the liquid reservoir and fed to the exchange area. The latter variant can be designed like a conventional peristaltic pump in which a roller element that engages externally pushes liquid by squeezing a squeezable portion of the fluid channel. Such systems are for example commonly used in the field of implanted delivery devices. Reference is, however, made to the document WO 99/41606 from the field of microdialysis as an example. In microdialysis it is for example possible to use channels with a diameter in the range of 10-1000 µm. Consequently pressures of a few millibars are sufficient to achieve linear flow rates of about 1 cm/min for channel lengths of a few centimeters. Such systems also have an evaluation unit connected to the sensor for converting sensor signals into concentration values of the analyte.

A device for liquid separation has for example proven to be necessary for $CO_2$ analytical systems that are used to analyse respiratory air. Measurement errors that are caused by drops of liquid in the gas analyser frequently occur especially in this field of application. These are for example formed when gas exhaled by humans is cooled below body temperature in the analytical system. Water contained in the respiratory air condenses on contact with the analytical system. A device according to the invention for example allows water to be separated from the respiratory air before it is passed into a $CO_2$ analyser.

Hence the invention concerns devices for bubble-free fluid transport that have for example proven to be necessary in the stated fields of application. An important aspect of the present invention is the design of the hollow body which is used for gas and liquid separation. In a preferred embodiment the hollow body has a high degree of symmetry and is spherical in an optimized embodiment. This simplifies the construction of the body and reduces the manufacturing costs which is particularly important when the device is used as a disposable device. The feed tube to the outlet opening of the hollow body preferably protrudes into the middle of the body; and in a preferred embodiment the inlet opening has no feed tube that leads into the inner space but rather ends in the wall of the hollow space. This arrangement ensures that the bubble of the separated phase is formed in a maximum size before the bubble can escape from the hollow body through the tube leading to the outlet opening. However, in other preferred embodiments care should at least be taken that the maximum volume of the bubble can be larger than 0.3 relative to the volume of the total hollow space without any escape of the separated phase independent of the orientation of the hollow body. In a preferred manner the maximum volumes of the amount of gas and liquid in the hollow space are so small that the phases are not mixed together by capillary and adhesion forces when the body is jolted so that gas or liquid separation is not impaired.

Within the scope of the invention there are several possibilities for arranging the outlet opening relative to the inlet opening. One possibility is that the outlet opening is arranged relative to the inlet opening such that an imaginary connection between the inlet opening, the outlet opening and the centre of the body space forms a rectangular triangle and their feed tube or tubes are arranged on the sides of the imaginary triangle. The outlet opening can also be located next to the inlet opening or be surrounded by the inlet opening or be arranged opposite to the inlet opening and have a screen which prevents a direct flow from the inlet opening to the outlet opening.

In a particularly advantageous process for manufacturing the device, the body is composed of several layers which have different shapes such that hollow spaces are formed when the layers are assembled. In a preferred manner the layers are designed such that they have depressions or recesses which form channels when they are joined together. This simplifies their manufacture and also facilitates miniaturization. The design and assembly of the layers can for example be realized with foils of different thicknesses. The foils can for example be made into the desired shape by means of dies or punches. In this process the inlet and outlet openings and their feed tubes are taken into account. The foils are joined together in such a manner that a hollow space is formed in the body in the desired shape which has the properties of the hollow body according to the invention for gas or liquid separation.

Silicon can for example also be used to manufacture the device. The layers are structured by known methods for microprocessing silicon. The layers are suitably shaped by for example using photolithography and subsequent etching. However, with regard to manufacture and cost it is preferable to manufacture the body from plastics, metals or ceramics. In particular the body or bodies can be manufactured in a particularly simple and economic manner from polymers in an injection moulding process in which for example recesses can be directly incorporated in the injection moulding process. However, it is also possible to subsequently machine a plastic body by embossing etc. Plastics that can be used for this purpose are for example polymethylmethacrylate and polycarbonate.

If the device is used for microdialysis, the material used to manufacture the system should be selected such that it is compatible with the dialysate or microperfusate and it does not result in changes that could unpredictably affect the concentration of the analyte to be determined or the analysis as such.

Before starting up the device for gas separation, it has proven to be advantageous to fill it with liquid to avoid entrapment of ambient air in the device. Entrapment of ambient air should also be avoided when the body is filled with liquid before starting-up. Gas bubbles that are already present in the hollow body before it is put into operation reduce the capacity of the body to take up gas from the liquid. In a corresponding manner the device for liquid separation is previously filled with gas before it is put into operation in a preferred embodiment.

The invention also concerns a microfluidic flow-through system which ensures orientation-independent gas or liquid separation. The microfluidic flow-through system comprises the device according to the invention for gas or liquid separation according to claim 1 or 2 and a system for transporting substances which, by means of a connection to the inlet opening of the device according to the invention, passes a fluid through the inlet opening into the hollow body. The fluid is conveyed through the feed tube of the outlet opening which protrudes into the inner space of the hollow body and out of the hollow body through the outlet opening of the device according to the invention. The fluid is conveyed onwards by a connection to the outlet opening of the device.

The device should be removed early enough from a microfluidic flow-through system before the separated phase can reach the outlet opening and escape from the hollow body. This can for example be ensured by calculating or estimating the volume of the separated phase at a given flow rate or at a given fluid volume and recommending the replacement of the device after a defined flow or a defined time. However, it is also for example possible to incorporate a sensor in the microfluidic flow-through system which transmits a signal as soon as the fluid contains bubbles after flowing through the device according to the invention. Such a sensor can be located within the fluid line upstream of the device according to the invention or for example in the microdialysis probe.

In a preferred embodiment the sensor monitors the function of the device according to the invention and thus enables the user to replace it in the flow-through system as soon as a gas or liquid separation function can no longer be ensured.

Preferred embodiments of the device of the microfluidic flow-through system are derived therefrom as already described.

In a preferred embodiment the microfluidic flow-through system for gas separation additionally comprises a pump that can regulate the flow rate of the liquid such that the amount of liquid to be analysed can be determined. The system is preferably operated at normal pressure and is preferably independent of the ambient pressure. In a preferred embodiment a flow-through system for gas separation in the sense of the invention comprises a microdialysis probe and a liquid reservoir as for example described above in addition to the device with a hollow body. In a preferred embodiment the device is positioned upstream of the microdialysis probe in the flow-through system. The device according to the invention for gas or liquid separation is preferably a disposable unit in the flow-through system which, as already described, is replaced in the system before the separated phase comes into contact with the tube leading to the outlet opening in the interior space.

FIG. 1: Device for gas or liquid separation.

Figure 2:
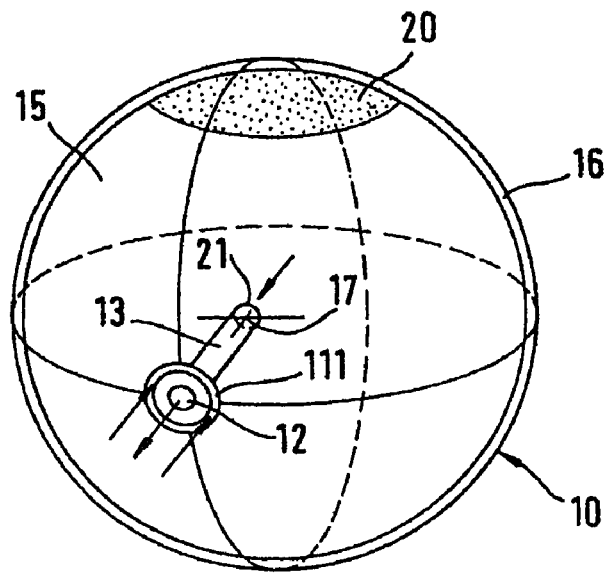

FIG. 2: Device for gas or liquid separation in which the inlet opening is arranged next to the outlet opening.

Figure 3:
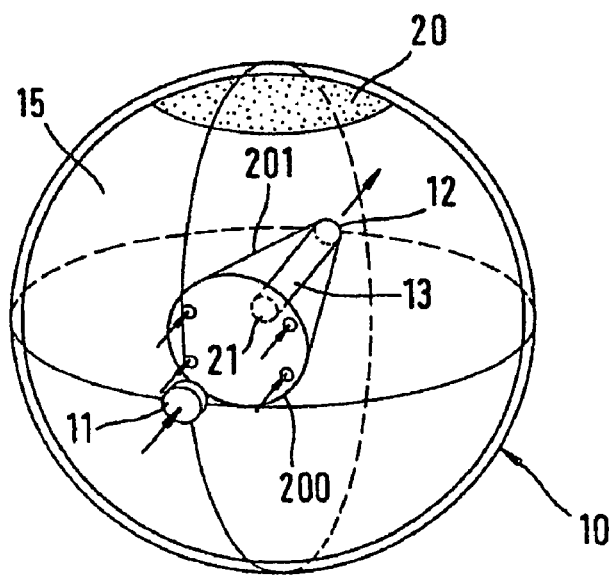

FIG. 3: Device for gas or liquid separation in which the inlet opening is arranged opposite to the outlet opening.

Figure 4:
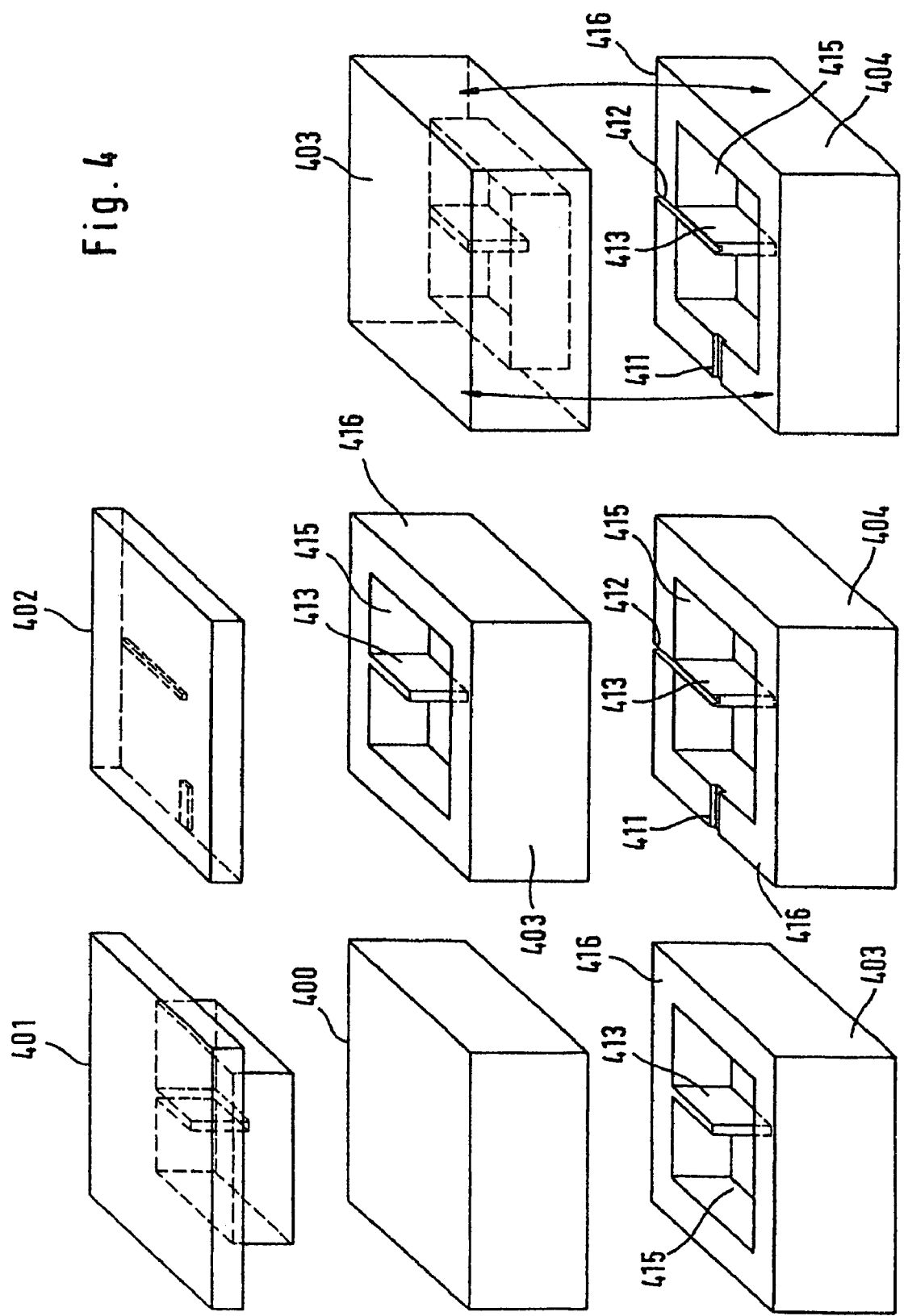

FIG. 4: Manufacturing process for a device for gas or liquid separation by embossing suitable structures.

Figure 5:
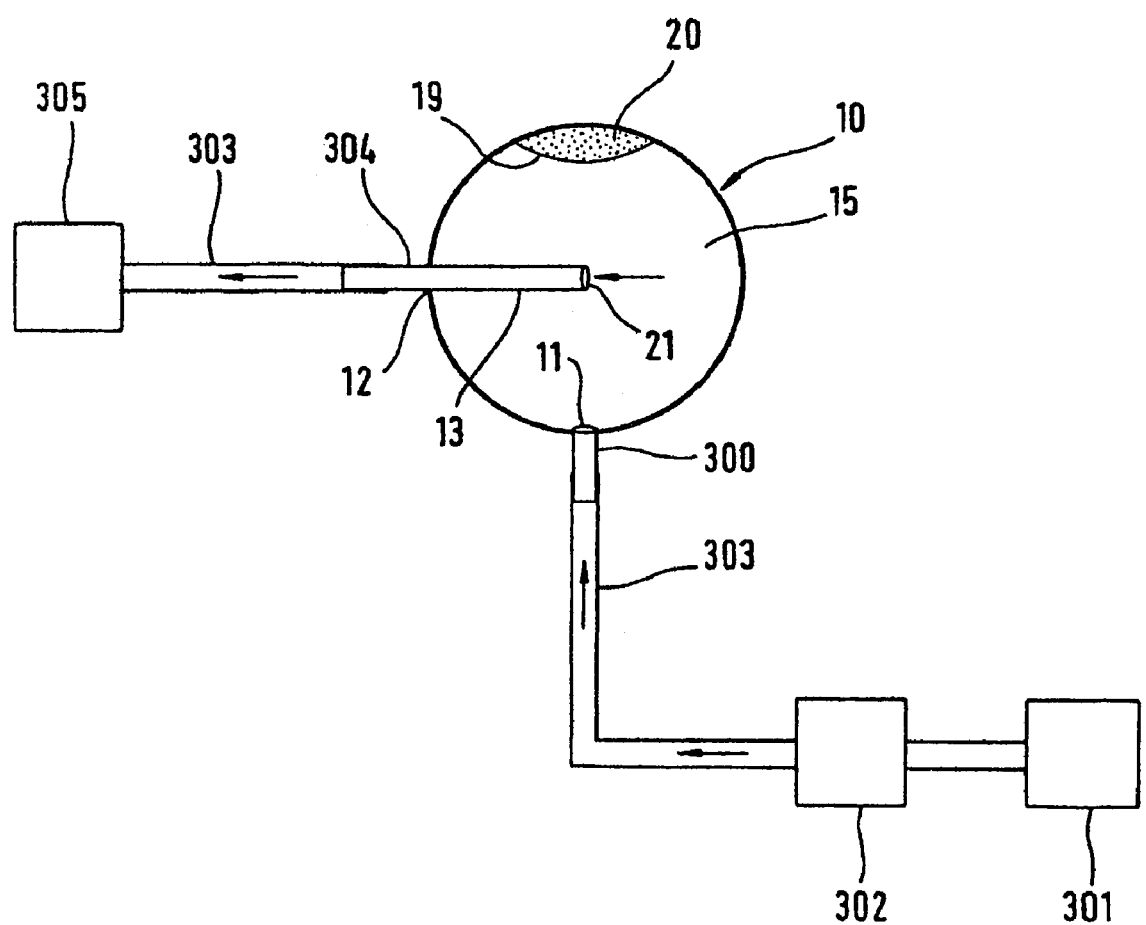

FIG. 5: Microfluidic flow-through system of a microdialysis.

FIG. 1 illustrates a preferred embodiment of a device for gas or liquid separation. The hollow body (10) shown is spherical and has an inlet opening (11) through which the fluid is conveyed and an outlet opening (12) which extends through the wall (16) of the hollow body (10). The inlet and outlet opening are each connected to a feed tube in the interior space wherein the tube (13) of the outlet opening extends to the centre (17) of the hollow body. The feed tube (14) of the inlet opening only protrudes slightly into the hollow space (15) of the hollow body (10). The hollow space (15) is bounded by the wall (16) of the hollow body. The inlet (11) and outlet opening (12) form an imaginary rectangular triangle (18) with the centre (17) of the hollow space which is shown for illustration. The tubes (13) and (14) are arranged on the sides of the rectangular triangle. Fluid flows through the inlet opening into the hollow space (15) of the body. The flow rate of the fluid is reduced in the hollow space of the body. The fluid that has entered initially remains in the hollow body. In the case of gas separation, gas bubbles can for example rise from the liquid or gas dissolved in the liquid can be released during the residence time of the fluid in the hollow body.

The separated gas rises into the upper portion of the hollow body where it collects in a gas bubble (separated phase (20)). The phase separation is illustrated in the figure by the marked phase boundary (19). After a certain residence time which depends on the flow rate, the fluid reaches the inlet (21) of the tube (13) through which the fluid passes out of the hollow body. The separated phase (20) remains in the hollow body while the fluid is conveyed through the outlet opening (12). This requires that the volume of the separated phase (20) is so small that it does not come into contact with the inlet (21) of the tube (13) independent of the orientation of the hollow body (10), said inlet being located in the middle (17) of the hollow space.

FIG. 2 shows a hollow body (10) in which the inlet opening (111) is arranged concentrically around the outlet opening (12). The outlet opening (12) is connected to a tube (13) which, as already shown in FIG. 1, extends into the centre of the hollow body. The embodiment of the device in FIGS. 1 and 2 only differ in the arrangement of the inlet openings 11 and 111 in the wall (16) of the hollow body (10). The inlet opening (111) has no feed tube. In order to maximize the volume of the separated phase (20) without the separated phase (20) coming into contact with the inlet (21) of the tube (13) of the outlet opening (12), the tube (13) also extends to the centre (17) of the hollow space (15) similarly to FIG. 1.

Another embodiment is shown in FIG. 3. In this case the inlet opening (11) of the hollow body (10) is positioned opposite to the outlet opening (12) and its feed tube (13). In order to avoid a direct flow between the inlet opening (11) and the feed tube (13) of the outlet opening, a screen (200) is positioned above the inlet (21) of the feed tube (13). The space between the inlet (21) of the tube (13) and the screen (200) is sufficiently large to allow fluid to flow unhindered through the inlet (21) or for fluid in the hollow space (15) to flow out of the outlet opening (12). The screen (200) is attached inside the hollow body by means of cross pieces (201).

The figures show examples of some models of the device according to the invention. Of course other designs of the hollow body or the hollow space are conceivable as well as other embodiments of the openings and feed tubes. The use of more than two openings and feed tubes may also be appropriate.

FIG. 4 shows examples of some process steps for manufacturing a device according to the invention. A process in which two plastic moulded parts are embossed and subsequently joined has proven to be particularly suitable since it enables a cheap and simple manufacture of a microdevice. The moulds (401, 402) required for the embossing can be manufactured for numerous microsystem methods and hence numerous embodiments of plastic moulded articles are conceivable. The moulded plastic parts in FIG. 4 have for example rectangular shapes.

In order to manufacture a device according to the invention for gas or liquid separation the process steps shown as an example in FIG. 4 are selected.

A plastic block (400) is embossed with the mould (401) so that the plastic block (400) is shaped like the mould (401). The moulded part (403) is obtained by the first embossing step. The moulded part (403) has a rectangular hollow space (415) and a rib (413) which extends from the edge (416). The moulded part (403) is subsequently moulded in a second embossing step using the mould (402). The second embossing step forms recesses for an inlet opening (411) and an outlet opening (412) which extend through the wall (416), as well as a recess in the rib (413) which makes the feed tube (413) of the outlet opening (412) of the manufactured device. In a last process step two moulded parts are joined together to form a hollow space with an inlet and outlet opening and their respective tubes. In principle several combinations are possible for assembling the formed pieces. Thus the moulded part (404) can be combined with an identical moulded part (404) as well as for example with a moulded part (403) which is obtained after the first embossing step.

FIG. 5 shows a microfluidic flow-through system which uses a hollow body (10) for gas separation. The hollow body (10) is connected to a system for conveying substances. The system for conveying substances has a connector (300) which is joined to the inlet opening (11) of the hollow body (10). The system also comprises a pump (301). The pump (301) conveys liquid from the liquid reservoir (302) by means of suitable tubes (303) to the connector (300) of the inlet opening (11). The liquid flows through the inlet opening (11) of the hollow body (10) into the hollow space (15) in which gas separation takes place. The gas separation is illustrated in FIG. 5 by the representation of a phase boundary (19). The separated gas collects in the gas bubble (20). The essentially gas-free liquid is conveyed by the tube (13) to the outlet opening (12) while the gas (20) remains in the hollow body (15). The essentially gas-free liquid passes from the outlet opening to the microdialysis probe (305) via the connecting piece of the substance conveying system. In the example shown it is also conceivable that the connecting pieces (300 and 304) of the inlet and outlet opening are directly connected to the liquid reservoir (302) or to the microdialysis (305) so that no additional tubes (303) are required. In the preferred embodiment that is shown, the hollow body (15) is positioned upstream of the microdialysis (305) so that the liquid which reaches the microdialysis is essentially free from gases. With a defined amount of liquid it is now possible to exactly measure an analyte to be examined. In order to ensure the functionality of the gas separation device, the volume of the gas bubble (20) is decisive. In this connection care must be taken that the volume of the gas bubble is not increased to such an extent that the gas bubble comes into contact with the inlet (21) of the tube (13). The hollow body (10) is removed from the flow-through system as a disposable unit before the gas bubble comes into contact with the inlet (21).

The invention claimed is:

1. A microfluidic device for separating liquid and gaseous phases in a microfluidic flow-through systems which can be operated independently of its orientation comprising:
    a hollow body connected to the microfluidic flow-through system such that the liquid to be transported is conveyed through the hollow body;
    wherein the hollow body comprises an inlet opening and outlet opening for feeding in and discharging the liquid;
    the hollow body defining a hollow space that is sized such that liquid and gas phases in the hollow space are prevented from mixing due to capillary and adhesion forces;
    wherein the inlet opening and the outlet opening are connected to a feed tube, wherein the feed tube extends into a hollow space of the hollow body; and
    wherein the feed tube at the inlet opening protrudes into the interior space of the hollow body such that it prevents a direct flow from the inlet opening to the outlet opening.

2. The microfluidic device of claim 1, wherein the cross-section of the hollow body in relation to the cross-section of the inlet opening or the cross-section of the feed tube is of such a magnitude that the flow rate decreases when the interior space of the liquid flows into the interior space of the hollow body.

3. The microfluidic device of claim 1, wherein the separated phase remains in the hollow space of the body and displaces the flowing phase.

4. The microfluidic device of claim 1, wherein the hollow space of the hollow body has a high degree of symmetry.

5. The microfluidic device of claim 1, wherein the hollow space of the hollow body is spherical.

6. The microfluidic device of claim 1, wherein the feed tube for the outlet opening extends to the centre of the hollow space of the hollow body.

7. The microfluidic device of claim 1, wherein the inlet opening has no feed tube extending into the hollow space of the hollow body.

8. The microfluidic device of claim 1, wherein the outlet opening is arranged relative to the inlet opening such that an imaginary connection between the inlet opening, the outlet opening and centre of the hollow space of the hollow body forms a triangle.

9. The microfluidic device of claim 8, wherein the feed tubes are arranged on the sides of the triangle.

10. The microfluidic device of claim 1, wherein the outlet opening is next to the inlet opening.

11. The microfluidic device of claim 1, further comprising a screen that prevents a direct flow from the inlet opening to the outlet opening.

12. The microfluidic device of claim 1, further comprising a connecting system connected to the hollow body for conveying substances.

13. The microfluidic device of claim 12, wherein the connecting system comprises a first connecting piece at the inlet opening of the hollow body to pass fluid into the hollow space and a second connecting piece at the outlet opening of the hollow body to convey the fluid forwards whereby the separated gas remains in the hollow space of the hollow body.

14. The microfluidic device of claim 12, wherein the connecting system has a pump to control the flow rate of the liquid to the inlet opening of the hollow body.

15. The microfluidic device of claim 12, further comprising a liquid reservoir, wherein the liquid reservoir is connected to the connecting system.

16. The microfluidic device of claim 15, wherein the liquid reservoir is connected to the a first connecting piece at the inlet opening.

17. The microfluidic device of claim 1, further comprising a microdialysis system downstream from the hollow body, such that liquid reaching the microdialysis system is substantially free from gases.

18. The microfluidic device of claim 1, further comprising a microdialysis probe, such that the liquid passes from the outlet opening to the probe.

19. A microfluidic device for separating liquid and gaseous phases in a microfluidic flow-through system which can be operated independently of its orientation comprising:
- a hollow body connected to the microfluidic flow-through system such that the liquid to be transported is conveyed through the hollow body;
- wherein the hollow body comprises an inlet opening and outlet opening for feeding in and discharging the liquid;
- the hollow body defining a hollow space that is sized such that liquid and gas phases in the hollow space are prevented from mixing due to capillary and adhesion forces;
- wherein the inlet opening and the outlet opening are connected to a feed tube, wherein the feed tube extends into a hollow space of the hollow body;
- wherein the feed tube at the inlet opening protrudes into the interior space of the hollow body such that it prevents a direct flow from the inlet opening to the outlet opening; and
- a connecting system connected to the hollow body for conveying substances.

20. The microfluidic device of claim 19, wherein the connecting system comprises a first connecting piece at the inlet opening of the hollow body to pass fluid into the hollow space and a second connecting piece at the outlet opening of the hollow body to convey the fluid forwards whereby the separated gas remains in the hollow space of the hollow body.

21. The microfluidic device of claim 19, wherein the connecting system has a pump to control the flow rate of the liquid to the inlet opening of the hollow body.

22. The microfluidic device of claim 19, further comprising a liquid reservoir, wherein the liquid reservoir is connected to the connecting system.

23. The microfluidic device of claim 22, wherein the liquid reservoir is connected to the first connecting piece at the inlet opening of the hollow body.

24. The microfluidic device of claim 19, further comprising a microdialysis system downstream from the hollow body, such that liquid reaching the microdialysis system is substantially free from gases.

25. The microfluidic device of claim 19, further comprising a microdialysis probe, such that the liquid passes from the outlet opening to the probe.

* * * * *

UNITED STATES PATENT AND TRADEMARK OFFICE
CERTIFICATE OF CORRECTION

PATENT NO.        : 7,682,430 B2                                         Page 1 of 1
APPLICATION NO.   : 10/487101
DATED             : March 23, 2010
INVENTOR(S)       : Peter Kraemer et al.

It is certified that error appears in the above-identified patent and that said Letters Patent is hereby corrected as shown below:

Title Page, Item (54) Title: Delete "MICROFLUIDID" and replace with -- MICROFLUIDIC --.

Col. 9, Claim 16 should read:
-- Claim 16. The microfluidic device of claim 15, wherein the liquid reservoir is connected to [the] a first connecting piece at the inlet opening. --.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,682,430 B2 Page 1 of 1
APPLICATION NO. : 10/487101
DATED : March 23, 2010
INVENTOR(S) : Peter Kraemer et al.

It is certified that error appears in the above-identified patent and that said Letters Patent is hereby corrected as shown below:

Title Page, Item (54) and at Col. 1, line 2, Title: Delete "MICROFLUIDID" and replace with -- MICROFLUIDIC --.

Col. 9, Claim 16, lines 46-47, should read:
-- Claim 16. The microfluidic device of claim 15, wherein the liquid reservoir is connected to [the] a first connecting piece at the inlet opening. --.

This certificate supersedes the Certificate of Correction issued May 25, 2010.

Signed and Sealed this

Twenty-second Day of June, 2010

David J. Kappos
*Director of the United States Patent and Trademark Office*